(12) United States Patent
Kinuhata et al.

(10) Patent No.: US 10,525,985 B2
(45) Date of Patent: Jan. 7, 2020

(54) INFORMATION OUTPUT APPARATUS FOR SADDLE-TYPE VEHICLE

(71) Applicant: KAWASAKI JUKOGYO KABUSHIKI KAISHA, Kobe-shi, Hyogo (JP)

(72) Inventors: Masanori Kinuhata, Kobe (JP); Masayuki Enomoto, Kobe (JP); Hiroshi Ishii, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 16/090,104

(22) PCT Filed: Mar. 30, 2016

(86) PCT No.: PCT/JP2016/001860
§ 371 (c)(1),
(2) Date: Sep. 28, 2018

(87) PCT Pub. No.: WO2017/168467
PCT Pub. Date: Oct. 5, 2017

(65) Prior Publication Data
US 2019/0111940 A1    Apr. 18, 2019

(51) Int. Cl.
*B60W 50/14*    (2012.01)
*G07C 5/08*    (2006.01)
(Continued)

(52) U.S. Cl.
CPC .............. *B60W 50/14* (2013.01); *B60K 35/00* (2013.01); *B62J 99/00* (2013.01); *G06F 3/167* (2013.01);
(Continued)

(58) Field of Classification Search
CPC ........ B60W 50/14; B60K 35/00; G06F 3/167; G07C 5/0833
See application file for complete search history.

(56) References Cited

U.S. PATENT DOCUMENTS

2003/0154022 A1*  8/2003  Tanabe ............... G01C 21/3626
                                                   701/533
2005/0021341 A1*  1/2005  Matsubara .............. G10L 15/07
                                                   704/275
(Continued)

FOREIGN PATENT DOCUMENTS

JP    2009023562 A    2/2009
JP    2010148718 A    7/2010
(Continued)

*Primary Examiner* — Thomas D Alunkal
(74) *Attorney, Agent, or Firm* — Alleman Hall Creasman & Tuttle LLP

(57) ABSTRACT

An information output apparatus for a straddle vehicle is configured to provide output information to a driver, and includes a receiving unit configured to receive input information input by the driver, a learning unit configured to learn an input tendency that is a tendency of the input information by the driver based on the input information received by the receiving unit, a generating unit configured to generate the output information according to a learned content learned by the learning unit, and an output unit configured to cause a sound device to output the output information generated by the generating unit in a form of a voice in natural language.

19 Claims, 7 Drawing Sheets

(51) Int. Cl.
*B62J 99/00* (2009.01)
*B60K 35/00* (2006.01)
*G06F 3/16* (2006.01)

(52) U.S. Cl.
CPC ...... *G07C 5/0833* (2013.01); *B60K 2370/148* (2019.05); *B60W 2050/143* (2013.01); *B60W 2300/36* (2013.01); *B62J 2099/0006* (2013.01)

(56) References Cited

U.S. PATENT DOCUMENTS

| | | | |
|---|---|---|---|
| 2005/0179540 A1* | 8/2005 | Rubenstein | B60R 16/0373 340/539.18 |
| 2007/0182532 A1* | 8/2007 | Lengning | G10H 1/0041 340/439 |
| 2014/0136187 A1* | 5/2014 | Wolverton | G10L 15/22 704/9 |
| 2015/0197308 A1* | 7/2015 | Butora | B62K 25/10 280/283 |
| 2016/0104486 A1* | 4/2016 | Penilla | H04L 67/12 704/232 |
| 2017/0021785 A1* | 1/2017 | Lim | B60R 16/0373 |

FOREIGN PATENT DOCUMENTS

| | | | |
|---|---|---|---|
| JP | 2010175361 A | 8/2010 | |
| JP | 2013024753 A | 2/2013 | |
| JP | 2013083498 A | 5/2013 | |

\* cited by examiner

INFORMATION OUTPUT APPARATUS FOR SADDLE-TYPE VEHICLE

TECHNICAL FIELD

The present invention relates to an information output apparatus for a saddle-type vehicle configured to provide output information to a driver.

BACKGROUND ART

Vehicles such as motorcycles and four-wheeled vehicles may include a device capable of assessing physical condition and the like of its driver and notifying the assessed result to the driver, and a biological information detection device disclosed in PTL 1 is known as an example.

CITATION LIST

Patent Literature

PTL 1: JP 2010-148718 A

SUMMARY OF INVENTION

Technical Problem

The biological information detection device of PTL 1 is configured to find unusualness of the driver based on detected information, but whether or not the driver is unusual with respect to acquired information varies depending on each driver, or depending on the environment, such as date, time, and location even with the same driver. Therefore, there may be a case where an alarm issued by the biological information detection device is unnecessary information for the driver, and the device is required to output information appropriate for each driver and the environment, such as date, time, and location.

In view of the above, an object of the present invention is to provide an information output apparatus for a saddle-type vehicle capable of appropriately providing information to a driver.

Solution to Problem

A saddle-type vehicle according to the present invention is an information output apparatus for a saddle-type vehicle configured to provide output information to a driver, and includes a receiving unit configured to receive input information input by the driver, a learning unit configured to learn an input tendency that is a tendency of the input information by the driver based on the input information received by the receiving unit, a generating unit configured to generate the output information according to a learned content learned by the learning unit, and an output unit configured to cause a sound device to output the output information generated by the generating unit in a form of a voice in natural language.

According to the present invention, the learning unit learns a tendency of the input information input by the driver, and the generating unit generates the output information according to the learned content thus learned. Therefore, the learning unit repeats learning by repeatedly acquiring the input information, which allows the learned content to be refined, and thus the tendency of the input information by the driver can be learned in more detail, and the output information reflecting the repeatedly learned content can be properly provided to the driver where appropriate.

In the above invention, the receiving unit may receive information on sound input through a sound input device that receives input by sound.

With the above configuration, communication can be made between the driver and the information output apparatus by using sound, which eliminates the need for operation using the driver's hands, feet, or the like to have communication, thereby improving convenience.

In the above invention, the output information may include vehicle condition information on a condition of the saddle-type vehicle.

The above configuration makes it possible to inform the driver about the conditions of the motorcycle which would be a matter of interest to the driver.

In the above invention, the output information may include driving operation assistance information on assistance for a driving operation by the driver.

According to the above configuration, assistance, for example, a proposal on the driving operation can be made in natural language.

In the above invention, the output information may include vehicle body setting information on assistance for setting a traveling function of the saddle-type vehicle.

According to the above configuration, assistance, for example, a proposal on the traveling function setting can be made in natural language.

In the above invention, the receiving unit may receive sound setting information on a mode of natural language selected by the driver from among a plurality of modes of natural language, and the output unit may cause the sound device to output the output information in a form of a voice in natural language in the mode selected by the driver, based on the sound setting information.

The above configuration makes it possible to change the mode of the sound to be output from the sound device according to a preference of the driver.

In the above invention, the receiving unit may receive external information besides the input information input by the driver, and the generating unit may generate the output information according to the learned content and the external information.

According to the above configuration, the learning unit learns the tendency of the input information, and the generating unit can generate the output information according to the learned content and the external information. This makes it possible to generate a wide variety of output information.

In the above invention, the receiving unit may receive as the input information, an output from at least one of a sensor configured to detect information on the vehicle body and an input device used for manual input by the driver.

According to the above configuration, input information that is an input other than the sound information can be learned and reflected on output information.

The above-described invention may further include a storage unit configured to store predetermined identification information in association with the learned content by the learning unit, the receiving unit may receive the identification information together with the input information, and the learning unit may acquire the learned content from the storage unit based on the identification information received by the receiving unit, and may learn the input tendency of the driver based on the acquired learned content and the input information received by the receiving unit.

According to the above configuration, even after changing the vehicle, the driver with the same identification information can use the learned content that has been learned by the previous vehicle.

A method of outputting information for a saddle-type vehicle according to the present invention is a method of outputting information for a saddle-type vehicle configured to provide output information to a driver, and includes a receiving step of receiving input information input by the driver, a learning step of learning an input tendency that is a tendency of input information by the driver based on the input information received in the receiving step, a generating step of generating the output information on the vehicle driving according to a learned content learned in the learning step, and an output unit of outputting the output information generated in the generating step from a sound device in a form of a voice in natural language.

According to the above configuration, the learning unit learns a tendency of the input information input by the driver, and the generating unit generates the output information according to the learned content thus learned. Therefore, the learning unit repeats learning by repeatedly acquiring the input information, which allows the learned content to be refined, and thus the tendency of the input information by the driver can be learned in more detail, and the output information reflecting the repeatedly learned content can be properly provided to the driver.

Advantageous Effects of Invention

The present invention can appropriately provide information to a driver.

DESCRIPTION OF EMBODIMENTS

Hereinafter, an information output apparatus 1 according to embodiments of the present invention will be described with reference to the drawings. It is to be noted that directions used in the following description are used simply for the sake of explanation, and do not limit the directions and the like of the configuration of the invention to the directions. Further, the information output apparatus 1 described below is merely one embodiment of the present invention. Accordingly, the present invention is not limited to the embodiments, and additions, deletions, and modifications can be made without departing from the scope of the invention.

Figure 1:
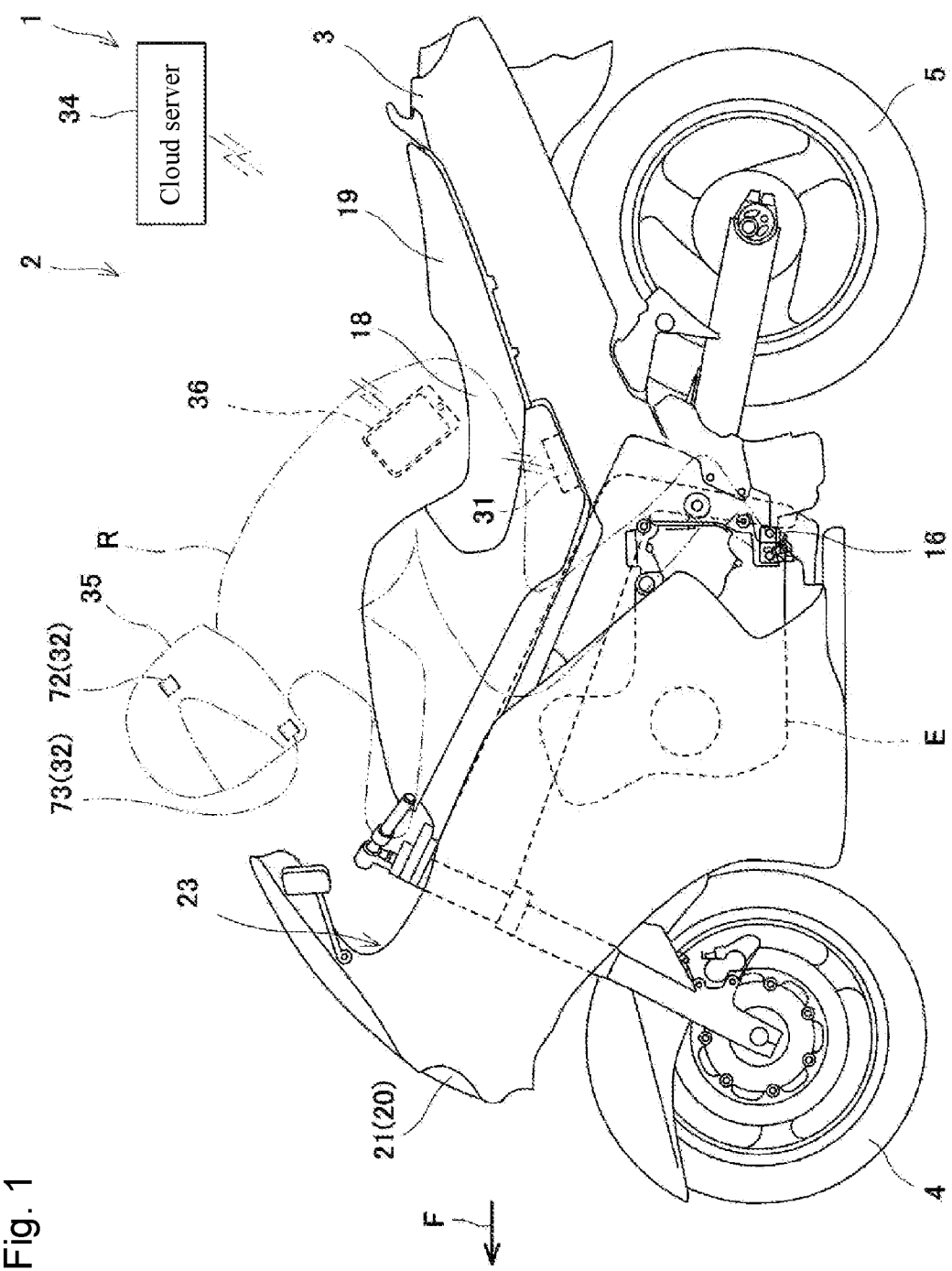
FIG. 1 shows a saddle-type vehicle including an information output apparatus according to an embodiment of the present invention.

In many cases, people ride saddle-type vehicles, such as motorcycles or all-terrain vehicles (ATV) on their own to enjoy driving or to travel, and even in double-riding, it is difficult to have a conversation with a fellow passenger while driving. According to the present invention, an information output apparatus 1 is provided to output information so that a driver can drive a saddle-type vehicle with a feeling of a conversation with a fellow passenger as in driving of a four-wheeled vehicle. The information output apparatus 1 provided in the motorcycle 2 as shown in FIG. 1 will be described below.

<Information Output Apparatus>

In the present embodiment, the information output apparatus 1 includes a vehicle-side output device 31, a sound device 32, and a server-side output device 33. The vehicle-side output device 31 is equipped with the vehicle body 3, and the server-side output device 33 is achieved by a server located away from the vehicle body 3, for example, a cloud server 34. The cloud server 34 is a server built on the cloud that is accessible to various clients through the Internet. Further, the sound device 32 is attached to a helmet 35 of a driver R, for example.

Figure 2:
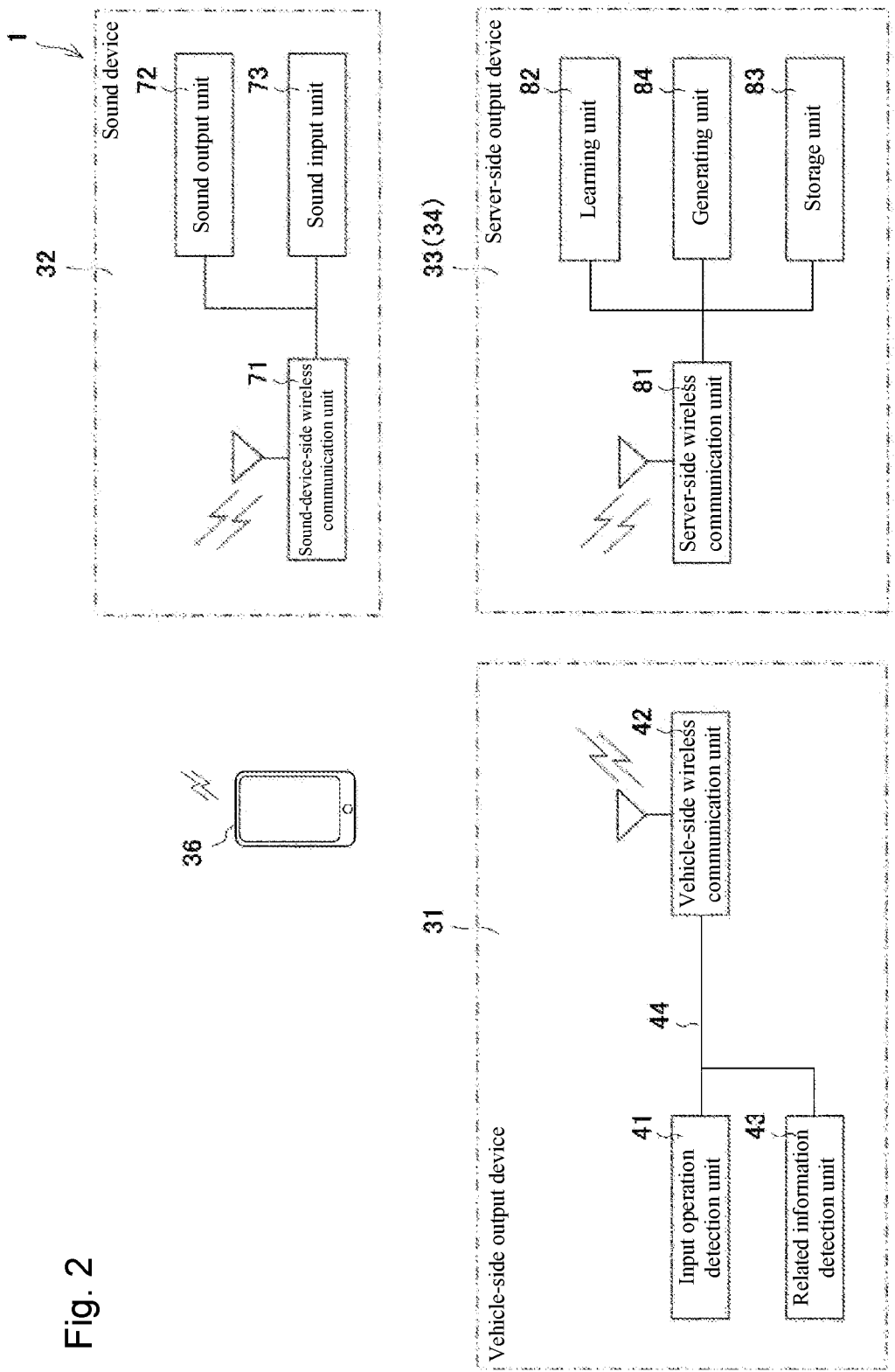
FIG. 2 is a block diagram showing a configuration of an information output apparatus according to a first embodiment.
Figure 3:
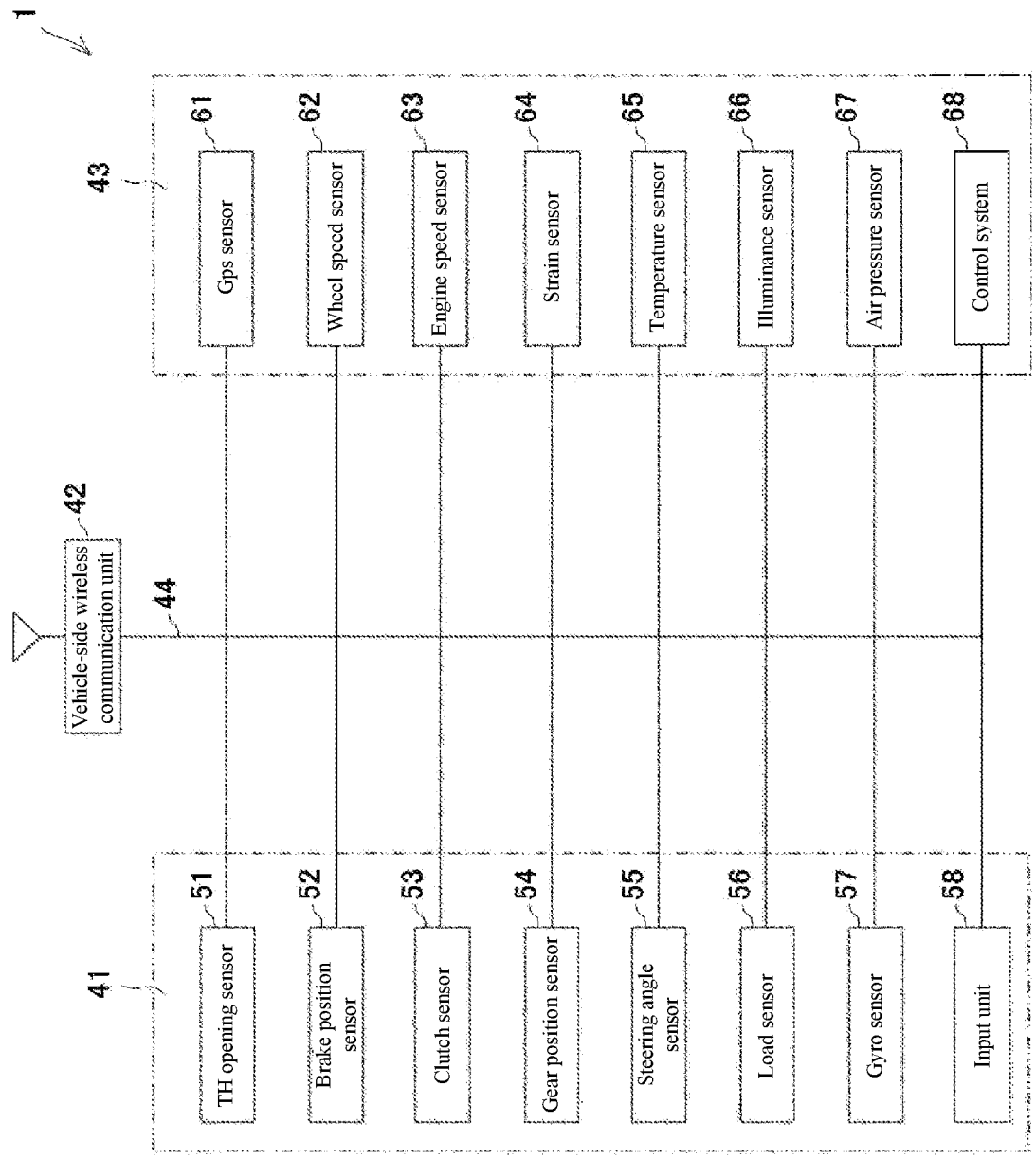
FIG. 3 is a block diagram showing in detail a vehicle-side configuration of the information output apparatus shown in FIG. 2.

As shown in FIG. 2, the vehicle-side output device 31 includes an input operation detection unit 41, a vehicle-side wireless communication unit 42, and a related information detection unit 43. The input operation detection unit 41 is configured to detect an input operation that has been input to the vehicle body 3 by an operation of the driver R. The input operation detection unit 41 detects, for example, whether or not the driver R has performed an accelerator operation, a brake operation, and a clutch lever operation, a shift operation by the driver R, a steering operation by the driver R, a weight shift operation by the driver R, a cornering operation by the driver R, and the like. The input operation detection unit 41 of the present embodiment includes sensors 51 to 57 and an input unit 58, as shown in FIG. 3. A throttle opening sensor (TH opening sensor) 51 detects an accelerator operation by the driver R based on an opening degree of the throttle valve. A brake position sensor 52 detects a brake operation by the driver R based on positions of a brake lever and a brake pedal. A clutch sensor 53 detects a clutch operation by the driver R based on the presence or absence of the clutch lever operation. A gear position sensor 54 detects a shift operation by the driver R based on a change in a gear position. A steering angle sensor 55 detects a steering operation by the driver R based on the rotation angle of a steering shaft (a steering angle of a front wheel 4).

Further, a load sensors 56 are respectively provided at a front seat 18, a rear seat 19, and steps 16 for the right and left feet of the motorcycle 2, and respectively detect the weight of the driver R, the weight of a fellow passenger, and the ratio of the weight of the driver R between the right side and the left side of the body (i.e., a lateral weight shift). In other words, the load sensors 56 respectively detect the presence or absence of the driver R and a fellow passenger, and the weight shift operation by the driver R. A gyro sensor 57 is configured to detect acceleration, velocity or angular displacement around three mutually orthogonal axes in the vehicle body 3. In the present embodiment, the gyro sensor detects the roll angle, the pitch angle, and the yaw angle of the vehicle body 3, and is configured to detect a cornering operation by the driver R, for example. The input unit 58 includes various switches for allowing the driver R to change the operation states of various devices. In the present embodiment, the input unit 58 includes, for example, a switch for changing the display of a meter device 23, a switch for changing a direction of irradiation of a headlamp 21, and the like.

Each of these sensors 51 to 57 and the input unit 58 is configured to detect an input operation performed by the driver R on the vehicle body 3 and output input operation information based on the detected input operation. The sensors 51 to 57 and the input unit 58 are connected to the vehicle-side wireless communication unit 42 via a transmission path such as a bus 44, and transmit the input operation information to the vehicle-side wireless communication unit 42.

The vehicle-side wireless communication unit 42 is capable of communicating with a portable information terminal 36 by short-distance wireless communication such as Bluetooth (registered trademark), accessible to a base station (not shown) via the portable information terminal 36 and connectable to the Internet. In addition, the vehicle-side wireless communication unit 42 is configured to communicate with the server-side output device 33 through the Internet. The vehicle-side wireless communication unit 42 is connected with the related information detection unit 43 in addition to the input operation detection unit 41.

The related information detection unit 43 is configured to detect information on other than the input operation by the driver, i.e., related information in relation to the motorcycle 2 (external information), for example, condition of the motorcycle 2, maintenance condition of the motorcycle 2, condition of the driver R, traffic information, weather, and the like. Examples of the condition of the motorcycle 2 include a current position of the motorcycle 2, a wheel speed, a rotation speed of an engine E, a steering torque, a temperature around the motorcycle 2, the brightness (i.e., the illuminance) around the motorcycle 2, and air pressure of a tire in each of a front wheel 4 and a rear wheel 5. In order to detect such related information, the related information detection unit 43 of the present embodiment includes sensors 61 to 67, as shown in FIG. 3. A GPS sensor 61 detects the current position of the motorcycle 2, and a wheel speed sensor 62 detects the rotational speed, i.e., the wheel speed of each of the front wheel 4 and the rear wheel 5. An engine speed sensor 63 detects the rotation speed of the engine E, and a strain sensor 64 detects an amount of strain around the axis of the steering shaft so as to detect the steering torque. A temperature sensor 65 detects the temperature around the motorcycle 2, and an illuminance sensor 66 detects the brightness (i.e., illuminance) around the motorcycle 2. Further, an air pressure sensor 67 detects air pressure of the tire in each of the front wheel 4 and the rear wheel 5. It should be noted that the weight of the driver R and the fellow passenger detected by the load sensor 56 may be acquired as related information. These sensors 61 to 67 are connected to the vehicle-side wireless communication unit 42 via the bus 44 and are configured to transmit the related information to the vehicle-side wireless communication unit 42. Further, the related information detection unit 43 is connected to the Internet via the vehicle-side wireless communication unit 42 and the portable information terminal 36, and acquires information on the traffic condition (including prediction) and the weather (including forecast), the maintenance condition of the motorcycle 2 stored in the server or the like.

In addition, the related information detection unit 43 is configured to detect information about the presence or absence of operation control of each component in the motorcycle 2 as the related information, and includes a control system 68 configured to detect such information. The control system 68 includes, for example, an engine electronic control unit (engine ECU), a brake electronic control unit (brake ECU) and the like, and the engine ECU is configured to electronically control a throttle device, a fuel injection device, and an ignition device, and is configured to further perform a supplementary control such as fuel cut and ignition cut with respect to fundamental electronic control. Further, the brake ECU is configured to control the operation of a brake mechanism not to lock the front wheel 4 and the rear wheel 5 (anti-lock brake system (ABS)), and control the distribution of the braking forces generated in the front wheel 4 and the rear wheel 5 (combined brake system (CBS)). The control system 68 that performs such supplementary control is also connected to the vehicle-side wireless communication unit 42, and is configured to transmit information about the presence or absence of such control as the related information. It should be noted that the engine ECU and the brake ECU may detect error information generated by detecting various errors, and may output the error information as the related information.

Further, the vehicle-side wireless communication unit 42 is capable of communicating with the sound device 32 by the short-distance wireless communication as described above, and is configured to transmit and receive sound information (sound signal) to and from the sound device 32. The sound device 32 includes a sound-device-side wireless communication unit 71, a sound output unit 72, and a sound input unit 73. The sound-device-side wireless communication unit 71 is configured to transmit and receive sound information to and from the vehicle-side wireless communication unit 42 of the vehicle-side output device 31. The sound-device-side wireless communication unit 71 is connected to the sound output unit 72 and the sound input unit 73. The sound output unit 72 is, for example, a speaker, and is mounted on the helmet 35 so as to be located near the ear of the driver R. It should be noted that the sound output unit 72 is not necessarily a speaker, but may be an earphone. Further, the sound output unit 72 is not limited to a unit that outputs sound, and may be a unit utilizing bone conduction.

The sound output unit 72 is configured to output in a form of sound (sound such as warning sound, and voice in natural language) sound information transmitted from the vehicle-side wireless communication unit 42 via the sound-device-side wireless communication unit 71. The sound input unit 73 is a microphone, for example, and is mounted on the helmet 35 so as to be located near the mouth of the driver R. The sound input unit 73 collects voice of the driver R. In other words, the sound input unit 73 allows the driver R to input voice in natural language, and converts the input voice into sound information and transmit it to the sound-device-side wireless communication unit 71. The sound-device-side wireless communication unit 71 transmits the sound information received from the sound input unit 73 to the vehicle-side wireless communication unit 42 of the vehicle-side output device 31 by the short-distance wireless communication. The transmitted sound information is then transmitted to the server-side output device 33 via the vehicle-side wireless communication unit 42 and the portable information terminal 36.

The server-side output device 33 includes a server-side wireless communication unit 81 so as to wirelessly transmit and receive information to and from the vehicle-side wireless communication unit 42, and further includes a learning unit 82 and a storage unit 83, and a generating unit 84 so as to process the received information. The learning unit 82, the generating unit 74, and the storage unit 83 are connected to each other so as to exchange information with each other. The learning unit 82, the storage unit 83, and the generating unit 84 are also connected to the server-side wireless communication unit 81, and are configured to acquire information transmitted from the vehicle-side output device 31.

The learning unit 82 acquires the input operation information transmitted from the vehicle-side output device 31 and the sound information transmitted from the sound device 32 via the vehicle-side output device 31. That is, the learning unit 82 acquires input information including at least one of the input operation information that has been input by the driver R and the sound information that has been input by using the voice of the driver R. Note that the learning unit 82 is configured to convert the input sound information into text by a voice recognition software (for example, ViaVoice (registered trademark) by IBM (registered trademark)), and information processing described later is performed based on the textualized sound information.

Also, the learning unit 82 learns tendencies of the input information (i.e., input tendencies) based on the acquired input information. For example, the learning unit 82 learns a tendency of the driving operation by the driver R, which is one of the input tendencies, based on the input operation information from the sensors 51 to 57. In other words, the learning unit 82 learns based on the input operation information from the sensors 51 to 57, tendencies of the driving operations, for example, a tendency of an accelerator operation (for example, a tendency to abruptly operate the accelerator, etc.), a tendency of a brake operation (for example, a tendency to abruptly operate the brake, etc.), a tendency of a clutch operation (a tendency to quickly operate a clutch lever, etc.), a tendency of a gearshift operation (a tendency to frequently use a particular gear position, etc.), tendencies of a handling operation and a cornering operation (a tendency to have a large bank angle of the vehicle body 3, etc.). Further, the learning unit 82 learns based on an input signal from the input unit 58, a tendency of the operation on a headlamp unit 20 (the time when the driver R often operates headlamp unit 20 to change its irradiation direction) and a tendency of a display switching operation of the meter device 23 (which item is the main interest of the driver R among the gauges).

Furthermore, the learning unit 82 learns based on the content of the sound information transmitted from the sound device 32 via the vehicle-side output device 31, learns a tendency of preferences of the driver R, such as tastes and likings, which is one of the input tendencies. For example, the learning unit 82 learns a tendency that a matter often appearing as a topic of conversations and the words indicating interests (such as "like", "want", or "interested") included in the sound information indicates the tastes and likings of the driver R. More specifically, in the case where a topic related to a tourist spot often appears in conversations, the learning unit 82 learns that the driver R likes sightseeing, and also learns a tendency of the time and destinations of the sightseeing. In the case where a topic related to the places to eat such as restaurants often appears in conversations in the acquired sound information, the learning unit 82 learns that the driver R likes to eat, and also learns a tendency of favorite foods and disliked foods, etc.

In addition to the tendencies of sightseeing and foods, the learning unit 82 also learns as input tendencies based on the sound information, tendencies of the preference in the vehicle body settings and the driving operations of the motorcycle 2, and a physical condition (illness, physical weariness, etc.) and a mood (emotions, such as delight, anger, sorrow, and pleasure etc.) of the driver R, which cannot necessarily be obtained only from the input operation information. For example, in the case where the sound information includes the conversations of which content concerns hopes for the damping force of the motorcycle 2 or the posture of the motorcycle 2, the learning unit 82 learns the content as a tendency of the vehicle body setting desired by the driver R, and in the case where the conversations include a content concerning acceleration/deceleration and cornering operation, the learning unit 82 learns the content as a tendency of the driving operations by the driver R. Furthermore, in the case where the sound information includes a content concerning the physical condition and the limit of the driver R, the learning unit 82 learns the content as a tendency of the physical condition and the mood of the driver R for each season (spring, summer, autumn, and winter) and for the time (morning, daytime, and night, for example). Furthermore, the relationship between the related keywords described above is analyzed to detect a tendency of preferences at a higher level than in the case where only the related keywords are simply used. The tendencies thus learned, that is, the input tendencies are stored in the storage unit 83 as learned contents (inclusive of the tendencies of the various items described above and the process of learning).

The storage unit 83 stores the above described learned contents in association with identification information allocated for each vehicle body 3 or for each driver R, and a large number of the learned contents are stored in association with a large number of the identification information. Therefore, the identification information is added to each information (input operation information, related information, and sound information) from the vehicle-side output device 31, and the learning unit 82 acquires the learned contents associated with the identification information from the storage unit 83 when acquiring the information added with the identification information, and learns again a tendency of each item of the input information based on the learned contents and the input information. Then, the freshly learned contents are stored again in the storage unit 83. The learned contents stored in this manner are utilized when the generating unit 84 generates output information.

The generating unit 84 is configured to generate information on a topic of a conversation with the driver R so as to have communication with the driver R, i.e., the output information, and the output information is generated according to the learned contents stored in the storage unit 83, the input operation information, the sound information, and output rules. The output rules are rules in which the learned contents, the input operation information, and the sound information that are to be referred to are associated with conversation topics (i.e., the output information) and their output timing. The output rules are stored in the storage unit 83 and is used to determine a conversation topic and its output timing. For example, the generating unit 84 refers to the driving operation tendency and the input operation information at a predetermined timing based on the output rules, and generates an evaluation (compliment or warning) of a current driving operation of the driver R and output information including a proposal on the driving operation (i.e., driving operation assistance information for assisting in the driving operation) according to the reference results. Specifically, when the driving (driving operation tendency) in which the accelerator operation by the driver R is gentle and is preferable for improving the fuel economy continues for a predetermined time (timing), the generating unit 84 generates output information for complimenting the driver R on the current driving. When sudden braking operations (driving operation tendency) is repeated equal to or more than a predetermined number of times (timing), the generating unit 84 generates output information to draw the driver R's attention to the driving operation tendency, and also output information that suggests starting a braking operation at an earlier timing to brake slowly (i.e., an example of the driving operation assistance information). In addition, the generating unit 84 also evaluates the way the driver R leans the motorcycle 2 (i.e., the way the driver R banks the motorcycle 2) during a cornering operation, the timing of the braking operation, the timing of shifting gears, etc., and generates output information that suggests measures to improve the evaluated results (i.e., an example of the driving operation assistance information) based on the input information, the driving operation tendency, and the output rules. Further, the generating unit 84 compares the driving operation tendency with the current driving operation by the driver R based on the driving operation tendency, the input operation information, and the output rules, and generates output information that points out a difference between the driving operation tendency and the current driving operation.

The generating unit 84 generates the output information (an example of vehicle body setting information) suggesting vehicle body settings of the motorcycle 2 (for example, a torque map of the engine E, geometry of the vehicle body 3, damping force of the suspension, etc.) at a predetermined timing (during stopping or during traveling) based on the driving operation tendency and the output rules. Further, the generating unit 84 generates the output information (an example of vehicle body setting information) prompting the driver R to operate the headlamp unit 20 (switching of its irradiation direction) according to the traveling in mountainous areas or urban areas (timing) based on the tendency of the switching operation and the output rules. Further, the generating unit 84 generates the output information (an example of vehicle condition information) notifying the driver R of the information that the driver R frequently displays on the meter device 23 (for example, the traveling distance, the remaining amount in the fuel tank, the fuel consumption, the travelable distance, vehicle speed, etc.) at a predetermined time or when a predetermined operation is performed (timing) based on the tendency of the display switching operation and the output rules. Although the above-described output rules exemplify rules for generating one piece of output information with respect to one driving operation tendency (or one piece of input information), the output rules may be rules for generating the output information based on a plurality of driving operation tendencies (or a plurality of pieces of input information). For example, the generating unit 84 may refer to the tendencies of the accelerator operation, the braking operation, and the cornering operation and generate the output information evaluating comprehensively those operations and suggesting measures to improve the evaluated results based on the output rules, and may generate the output information making a comprehensive suggestion about settings of the torque map of the engine E, the geometry of the vehicle body 3, and the damping force of the suspension.

Furthermore, the generating unit 84 is configured to generate the output information, specifically, the output information including a content regarding tourist spots and restaurants, a content to prompt the driver R to go to the tourist spots and the restaurants, or a content concerning the tastes and the preferences of the driver R, based on not only the driving operation tendency but also input tendencies other than the driving operation tendency and the output rules. For example, in the case where the learning unit 82 has learned that the driver R tends to enjoy observation of plants, the output information that "The flowers of AAA are in the best times to see right now. You can see the flowers of AAA at BBB near here." is generated based on the output rules at the timing when a topic of flowers is included in the sound information. In addition, in the case where the learning unit 82 has learned that the driver R tends to enjoy eating, the output information that "CCC (name of food) is in season and you can eat them at DDD (name of a shop)" is generated based on the output rules at the timing when a topic of food is included in the sound information. Note that the output information regarding tourist spots, restaurants, tastes, and preferences is generated based on information stored in advance in the storage unit 83 and information acquired from the Internet.

Further, the generating unit 84 generates the output information and the like including a notification and a proposal on the physical condition of the driver R based on the output rules with reference to the tendency of the physical condition of the driver R and the sound information. For example, in the case where the learning unit 82 has learned that the driver R tends to drive in the morning with insufficient sleep, the output information including a warning against carelessness caused by lack of sleep is generated based on the output rules at the timing when sound like a yawn is included in the sound information. Further, the generating unit 84 generates the output information including a content to prompt the driver R to care for himself/herself (a content suggesting a medical care) based on the output rules at the timing when a content that explicitly indicates or implies that the driver R has gotten sick such as a cold, etc. is included in the sound information. Further, the generating unit 84 generates the output information including a content to prompt the driver R not to lose his/her cool based on the output rules at the timing when a content that explicitly indicates or implies that the driver R is angry or irritated is included in the sound information or after a lapse of a predetermined time.

The current physical condition and the current mood of the driver R are not necessarily acquired from the sound information, but may be learned from the current driving condition by the driver R. Specifically, they can be acquired from a difference between the driving operation tendency and the current driving condition of the driver R (the driving operation is rough, or the driving operation is slow). According to the output rules described above, the output information may be generated by referring to other tendencies, for example, two or more tendencies such as the mood and the taste of the driver R, instead of referring to each tendency, such as a tendency of the tastes, the preferences, the physical conditions, the limits, and the like, in the same manner as the driving operation tendency. This configuration makes it possible to provide the driver R with a proposal of a comprehensive content (for example, "You may be in a bad mood, so how about going to the sea for a change?"). Further, information that is not displayed on the meter device 23, such as information on the number of years of ownership of the motorcycle 2 and the highest speed up to now, may be generated based on the output rules as the output information at the time when they were achieved. The output information generated in this manner is stored in the storage unit 83.

According to the output rules, the generating unit 84 is configured to refer to the input tendencies and the related information from the vehicle-side output device 31 and generate the output information according to the related information. For example, the generating unit 84 refers to the driving operation tendency and the related information from a control system 68, and generates the output information notifying that the control system 68 has performed supplementary control (the above-described fuel cut, and ignition cut) regarding the preceding driving operation based on the referred result and the output rules, immediately after the supplementary control has been performed (timing). Further, the generating unit 84 refers to the driving operation tendency and the related information from the GPS sensor 61, and generates the output information of the suggested content according to the traveling place. For example, when the driving operation tendency indicates that the driver R tends to enter an intersection or the like at a high speed and the GPS sensor 61 detects that the driver R is travelling in an urban area, the generating unit 84 generates, based on the output rules, the output information to prompt the driver R to pay attention to a possibility that a pedestrian may run out from the sidewalk before entering an accident-prone area (timing). In the case where the driver R tends to make sudden operation of the accelerator and there is a forecast of rain, the generating unit 84 generates, based on the output rules at the time of obtaining the weather forecast, the output information indicating that it will start to rain, and also indicating that the traveling behavior of the motorcycle 2 may become unstable as the rear wheel 5 is slippery in rain. Further, the generating unit 84 generates the output information to refrain from a sudden operation of the accelerator in rain.

The generating unit 84 refers to the related information, and generates the output information including various reports and questions based on the referred result of the related information and the output rules so as to communicate with the driver R. For example, the generating unit 84 generates the output information including reports and questions about the condition of the motorcycle 2, the vehicle body settings, and the like. For example, the generating unit 84 refers to the detection result by the air pressure sensor 67 (related information), and generates the output information on the air pressure of each of the front wheel 4 and the rear wheel 5 based on the output rules when the content concerning the air pressures of the front wheel 4 and the rear wheel 5 is included in the sound information from the sound device 32 (timing). Further, when the generating unit 84 refers to the detection result of the temperature sensor 65 (related information) and the detection result indicates that it is cold (timing), the generating unit 84 generates the output information suggesting preparation for the cold weather based on the output rules. Further, when the generating unit 84 refers to the sound information and the detection result of the illuminance sensor 66 (related information) and the detection result indicates that it is dark (timing), the generating unit 84 generates the output information suggesting changing the irradiation direction of the headlamp unit 20 based on the output rules.

Furthermore, the storage unit 83 stores answers to questions regarding a plurality of items (for example, about 100 items) that has been input in advance. The advance questions include questions (gender, physique, preferences, character, etc.) regarding the driver R and preferences regarding the output information generated by the generating unit 84. First, the learning unit 82 grasps the basic outline of the input tendency based on the answers to the advance questions, and learns the input tendency from the various input information based on the basic outline. This configuration makes it possible to generate the output information close to the needs of the driver R, and shorten the time required to generate the output information that suits the needs of the driver R, i.e., the time required to refine the learned contents, even when time has not elapsed since the introduction of the information output apparatus 1. Note that the learning unit 82 may learn the output information and the output timing that suit the needs of the driver R based on the answers to the advance questions, that is, may learn the output rules.

The advance questions also include questions about preferences regarding the manner of the sound to be output from the sound output unit 72 (such as personality, sex, dialect, language, and tone of the voice (high or low)). For example, the personality includes options, such as making jokes, many proposals on the driving operation, and less talkative. This configuration makes it possible to achieve conversations that suit the preference of the driver. The generating unit 84 sets a sound mode according to the preferences regarding the manner and the personality of the sound, and generates the output information including the set sound mode. With this configuration, the output information can be output from the sound output unit 72 in a voice according to the set sound mode.

As described above, in the server-side output device 33, the learning unit 82 learns the input tendencies, and the generating unit 84 refers to the learned contents, the input information, and the sound information, and generates the output information based on the output rules. The learning unit 82 and the generating unit 84 having such features are achieved by performing information processing using a neural network, Watson (registered trademark), random forests, etc., and the output information is generated by performing the above described information processing. The output information is information to be output from the sound output unit 72 of the sound device 32 in the form of a voice in natural language. The generating unit 84 converts the output information which is text data into the sound information of analog sound signals by using a speech synthesis software (for example, ViaVoice (registered trademark) by IBM (registered trademark), FineSpeech (registered trademark) by FUJITSU LIMITED. (registered trademark), etc.). The generated sound information is transmitted from the generating unit 84 to the server-side wireless communication unit 81, and wirelessly transmitted to the sound device 32 via the server-side wireless communication unit 81 and the vehicle-side wireless communication unit 42. Then, the sound information is output from the sound output unit 72 of the sound device 32 as a voice in natural language, and transmitted to the driver R. It should be noted that all the text data included in the output information is not necessarily converted into the sound information, and only the text data concerning the main content, especially the content relating to the driving operation, may be converted in the sound information and transmitted to the driver R.

The information output apparatus 1 is capable of changing the form of the sound to be output from the sound output unit 72. For example, sound setting information can be input by using the sound through the sound input unit 73, and the generating unit 84 acquires the sound setting information through each of the communication units 71, 42, and 81. Furthermore, the generating unit 84 sets the sound mode based on the sound setting information, and generates the sound information by converting the text data of the output information into the sound information according to the set sound mode. The output information thus generated is transmitted to the sound output unit 72 as described above, and the sound according to the set sound mode is output from the sound output unit 72. The sound mode is not necessarily input from the sound input unit 73 but may be input by the input unit 58.

Furthermore, the information output apparatus 1 is capable of communicating with the driver R while driving even when the driver R alone is riding the motorcycle 2 so as to generate a situation in which the driver R feels as if he/she is talking with another person, a fellow passenger. That is, the driver R can input his/her voice to the sound input unit 73 in response to the voice output from the sound output unit 72. For example, when the sound output unit 72 outputs the voice saying, "Your accelerator operation is rough today", the driver R can respond via the sound input unit 73 that "My accelerator operation may be rough because I'm in a hurry today." Such a conversation allows the learning unit 82 to obtain a response to the output information based on the sound information to be input via the sound input unit 73. The learning unit 82 learns the evaluation of the output information by the driver R based on the response thus obtained. The aforementioned response is an example of a response that agrees to the output information. Therefore, the learning unit 82 learns that the response is affirmative and the driver R is favorable to the content included in the output information. On the other hand, in the case of a negative response, such as silence, "I want you to be quiet", or "Please do not ask me about everything", etc., the learning unit 82 learns that the driver R has a negative feeling toward the content included in the output information. Such extraction work of the evaluation is achieved by, for example, text mining technique, which enables determination whether the textualized context is affirmative or negative by using a predetermined logic.

In this manner, the learning unit 82 obtains the evaluation of the output information by the driver R, thereby learning to adjust the output rules according to the driver's preferences. That is, when the evaluation of the output information by the driver R is favorable, the learning unit 82 increases the assignment of weight to one of the output rules on the basis of which the output information has been generated and other output rules similar thereto, and actively and frequently uses the output rule and the output rules similar thereto. As a result, an output rule having highly assigned weight is to be adopted frequently. On the other hand, when the evaluation of the output information by the driver R is negative, the learning unit 82 decreases the assignment of weight to one of the output rules on the basis of which the output information has been generated and other output rules similar thereto, and less frequently uses the output rule and the output rules similar thereto, or changes the content of the output rule on the basis of which the output information has been generated so that different output information is to be generated.

In this way, the learning unit 82 learns the driver R's favorite output rules so as to output the output information that suits the preferences of the driver R. Note that when learning the driver R's favorite output rules, the learning unit 82 does not necessarily use both positive and negative responses, but may use either one of the positive or negative responses. In this way, the learning unit 82 learns the driver R's favorite output rules based on the evaluation of the output information by the driver R, and stores the output rules in the storage unit 83 together with the learned contents with respect to the driving operation tendency.

Figure 4:
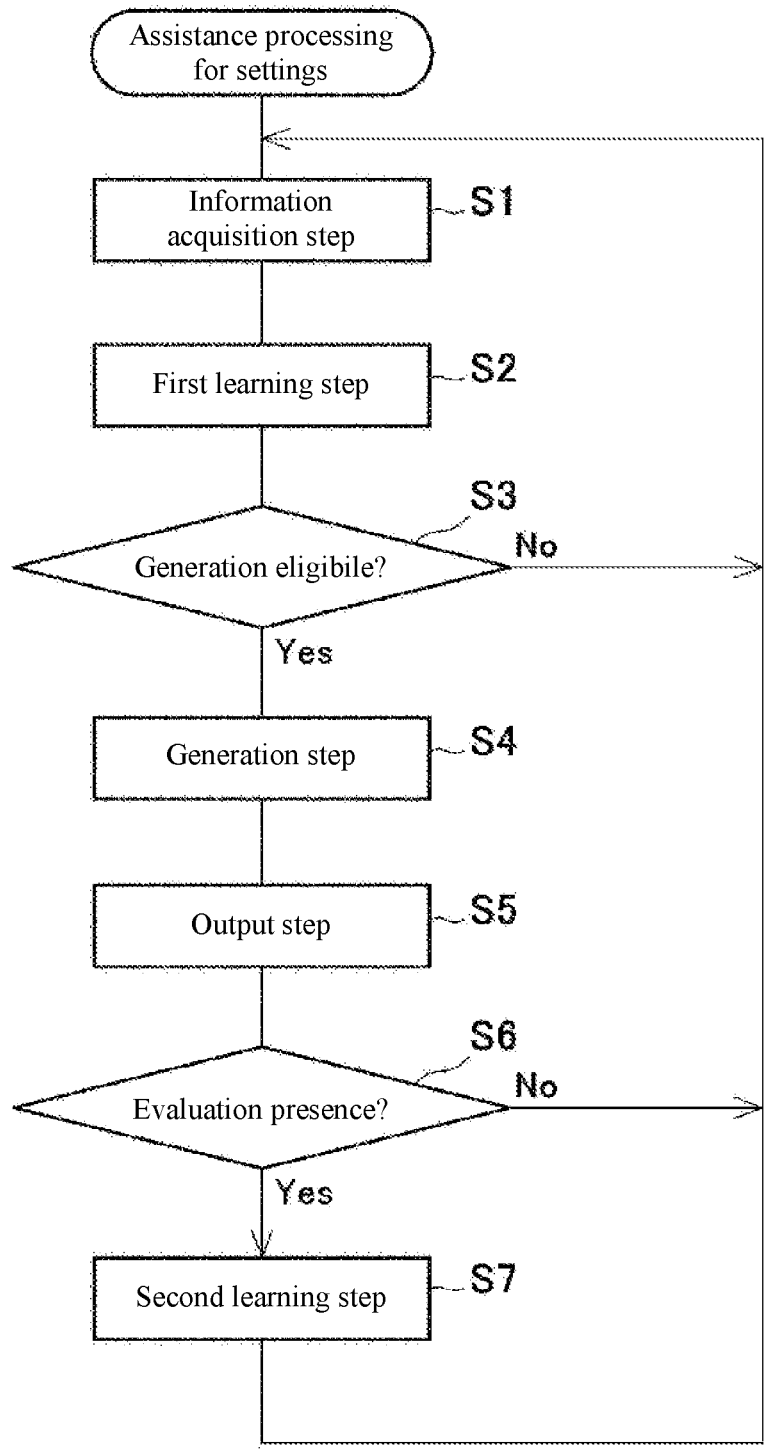
FIG. 4 is a flowchart showing steps of an information output processing of the information output apparatus.

Hereinafter, the steps (information output processing) in which the information output apparatus 1 generates the output information based on the input information and the related information, and outputs the output information in a form of a voice in natural language from the sound output unit 72 of the sound device 32 are described with reference to FIG. 4. As described above, the information output apparatus 1 acquires the answers to the questions in advance and causes the storage unit 83 to store the answers, and the learning unit 82 grasps in advance a basic outline of the input tendencies based on the stored answers, and causes the storage unit 83 to store the basic outline as an input tendency. From the initial startup operation after responding to the advance questions, the input tendencies that have been learned until then are stored in the storage unit 83 and used. The sound mode of the sound from the sound output unit 72 is determined based on the answers to the advance questions and the information input from the input unit 58. The information output apparatus 1 starts the information output processing in a state where the advance setting has been made in this manner, and step S1 is performed when the information output processing is started.

In step S1 that is an information acquisition step, the learning unit 82 acquires via the wireless communication units 42, 71, 81, the sound information input to the sound input unit 73 of the sound device 32 and the input operation information detected by the sensors 51 to 57 of the input operation detection unit 41 in the vehicle-side output device 31. When the learning unit 82 acquires the sound information and the input operation information, the process proceeds to step S2.

In step S2 that is a first learning step, the learning unit 82 learns the input tendencies of the driver R based on the acquired sound information and the input operation information while referring to the input tendencies stored in the storage unit 83. For example, the learning unit 82 learns the tendency of the driver R's preferences from the contents of the sound information, and learns the driving operation tendencies of a brake operation, a clutch operation, a gear shift operation, a handling operation, a cornering operation, and the like. Further, the learning unit 82 learns the tendency of the irradiation direction of the headlamp unit 20 and the tendency of the display switching operation of the meter device 23 based on the operation of the input unit 58. The learned contents thus learned by the learning unit 82 are stored in the storage unit 83. When the learned contents are stored, the process proceeds to step S3.

In step S3 that is a generation-eligibility determination step, the generating unit 84 determines whether to generate the output information based on the output rules. That is, it is determined whether or not it is the timing that each input tendency learned in step S2 should be raised as a topic. Specifically, the generating unit 84 determines whether or not the timing defined by the output rules is satisfied based on the input information and the related information. For example, in the case where the learning unit 82 has learned the tendency of the driver R's tastes (tourist spots, foods, etc.) in step S2, the generating unit 84 determines whether it is time to raise the learned tendency as a topic based on whether or not the content regarding the driver R's tastes (tourist spots, foods, etc.) is included in the sound information input to the sound input unit 73. Or, in the case where the learning unit 82 has learned the operation tendency of the driver R in step S2, the generating unit 84 determines whether it is time to raise the tendency as a topic based on the acquired related information (e.g., rainy weather, traveling area, etc.). When the conversation or the related information does not include the content, the generating unit 84 determines that it is not time to raise the content as a topic, and the process returns to step S1. On the other hand, the conversation or the related information includes the content, the generating unit 84 determines that it is time to raise it as a topic, and the process proceeds to step S4.

In step S4 that is a generation step, the generating unit 84 refers to the input tendency determined to be raised as a topic in step S3, and generates the output information based on the output rules. For example, in the case where the tendency of the tastes of the driver R, more specifically sightseeing and food are determined to be raised as a topic in step S3, the generating unit 84 refers to the information acquired from the storage unit 83 and the Internet (external information), and generates the output information including the content concerning the tourist spots and the restaurants or the content to suggest visiting the tourist spots and the restaurants. In the case where the driving operation tendency should be raised as a topic in step S3, the generating unit 84 generates the output information including an evaluation or a proposal on the driving operation tendency, or generates the output information suggesting for the vehicle body settings of the motorcycle 2 according to the driving operation tendency. Or, in the case where the driving operation tendency should be raised as a topic in step S3, the generating unit 84 may generate the output information on the vehicle condition etc. with reference to the related information along with the driving operation tendency. The output information thus generated is stored in the storage unit 83 after being converted from the text data to the sound information as necessary, and the process proceeds to step S5 when the sound information is stored.

In step S5 that is an output step, the output information generated by the generating unit 84 is transmitted to the sound output unit 72 via the server-side wireless communication unit 81, the vehicle-side wireless communication unit 42, and the sound-device-side wireless communication unit 71. The sound output unit 72 of the sound device 32 outputs the output information that has been converted into a voice in natural language, and transmitted to the driver R. When the output information is transmitted to the driver R, the process proceeds to step S6. In step S6 that is an evaluation presence/absence determination step, the sound information is input to the sound input unit 73 after the output of the output information, and the learning unit 82 determines whether or not the sound information includes any evaluation on the output information. That is, the sound information is transmitted to the learning unit 82 via the communication units 71, 42, 81, and the learning unit 82 determines whether or not the sound information includes any evaluation on the output information. When there is no sound information for a predetermined time or a content of the sound information if any does not include any evaluation, a question is asked again or the process returns to step S1 to provide different output information. On the other hand, in the case where there is sound information of which content includes a response, the process proceeds to step S7.

In step S7 that is a second learning step, the learning unit 82 learns the tendency of evaluation of the output information. In the case where the evaluation of the output information is positive, the learning unit 82 learns the tendency of evaluation that the output rule on the basis of which the output information has been generated is favorable. Accordingly, the learning unit 82 increases the assignment of weight to the output rule and other output rules similar thereto, and actively generates the output information and information similar thereto. On the other hand, in the case where the evaluation of the output information is negative, the learning unit 82 learns the tendency of evaluation that the driver R has a negative feeling toward the output rule on the basis of which the output information has been generated, and decreases the assignment of weight to the output rule and other output rules similar thereto to refrain from generating the output information and information similar thereto. This makes it possible to estimate the output information desired by the driver R, and such output information is output to continue the communication between the driver R and the information output apparatus 1. When the learning unit 82 learns the output rules according to the evaluation by the driver R, the process returns to step S1.

Note that the second learning step, the first learning step, and the generation step are performed as a series of operations of the above described information processing, and these three steps are not always clearly distinguished. In the case where the process returns to step S1 to generate the output information again and the evaluation in the previous step S6 is positive, the generating unit 84 further generates the output information based on the output rules not only by referring to the input tendencies, the input information, and the related information but also in consideration of the content that has been output in step S4 so as to continue the conversation. This enables a content of the following output information to be related to the preceding output information, so that the communication between the driver R and the information output apparatus 1 can be continued. Even in the case where the evaluation is negative, the following output information may have a content related to the preceding output information so as to continue the communication between the driver R and the information output apparatus 1.

In the information output apparatus 1 configured as described above, the learning unit 82 learns the input tendency that the driver R inputs, and the generating unit 84 generates the output information based on the learned contents thus learned. Therefore, the learning unit repeats learning by repeatedly acquiring the input information, which allows the learned contents to be refined, and thus the input tendency by the driver R (the above-mentioned driving operation tendency, and the tendency of the preferences, etc.) can be learned in more detail. With this configuration, the output information reflecting the learned content can be provided to the driver R appropriately. In the information output apparatus 1, the output information can be provided to the driver R using a voice in natural language. In the motorcycle 2, a region where information can be displayed is so small relative to four-wheeled vehicles or the like that it is difficult to appropriately convey the generated information. However, the information output apparatus 1 conveys the output information by using a voice in natural language, which enables the content of the output information to be appropriately provided to the driver R.

According to the information output apparatus 1 of the present embodiment, sound can be input to the sound input unit 73. Thus, the learning unit 82 learns the input tendency using the sound from the driver R, i.e., the sound information as the input information, and the generating unit 84 generates the output information by referring to the learned contents. Therefore, communication can be made between the driver R and the information output apparatus 1 by using sound, which eliminates the need for operation using the driver's hands, feet, or the like to have the communication, thereby improving convenience.

Furthermore, according to the information output apparatus 1, the learning unit 82 learns the input tendency, and the generating unit 84 can generate the output information with reference to the learned contents and external information. This makes it possible to generate a wide variety of output information. For example, reference to the external information, particularly reference to the related information enables the output information to include information on the vehicle condition, assistance for driving operation (i.e., proposal on the driving operation), assistance for the vehicle body settings (i.e., proposal on the vehicle body settings), and the like. Therefore, it is possible to inform the driver about the conditions of the motorcycle 2 which would be a matter of interest to the driver R, and the assistance for the driving operation. Further, according to the information output apparatus 1, the mode of the sound information to be notified to the driver R can be changed through the sound input unit 73 or the input unit 58. This makes it possible to change the sound to be output from the sound output unit 72 according to the preference of the driver R.

In addition, according to the information output apparatus 1 of the present embodiment, the learning unit 82 and the generating unit 84 each of which requires high processing capability are disposed in the cloud server 34 that is away from the vehicle body 3. Since the motorcycle 2 includes a large number of components that are arranged closely, the motorcycle 2 does not have high degree of freedom in designing all the configurations, and thus in some cases, cannot adopt arithmetic processing equipment having large processing capability. On the other hand, when the learning unit 82 and the generating unit 84 are disposed in the cloud server 34, the degree of freedom in design for the arithmetic processing equipment that achieves the learning unit 82 and the generating unit 84 can be increased, as the cloud server 34 has high degree of freedom in designing the components as compared to the motorcycle 2. Therefore, for example, it is possible to adopt the arithmetic processing equipment having high arithmetic processing capability, thereby achieving the learning unit 82 and the generating unit 84.

Further, according to the information output apparatus 1 of the present embodiment, the learned contents are stored in the storage unit 83 together with the identification information. Accordingly, even after changing the vehicle, the driver R with the same identification information can take over the learned contents that have been learned by the previous vehicle.

Second Embodiment

An information output apparatus 1A of a second embodiment is similar in the configuration to the information output apparatus 1 of the first embodiment. Therefore, the configuration of the information output apparatus 1A according to the second embodiment will be described only for a configuration that is different from that of the information output apparatus 1 of the first embodiment, and the descriptions of the same configurations will be omitted.

Figure 5:
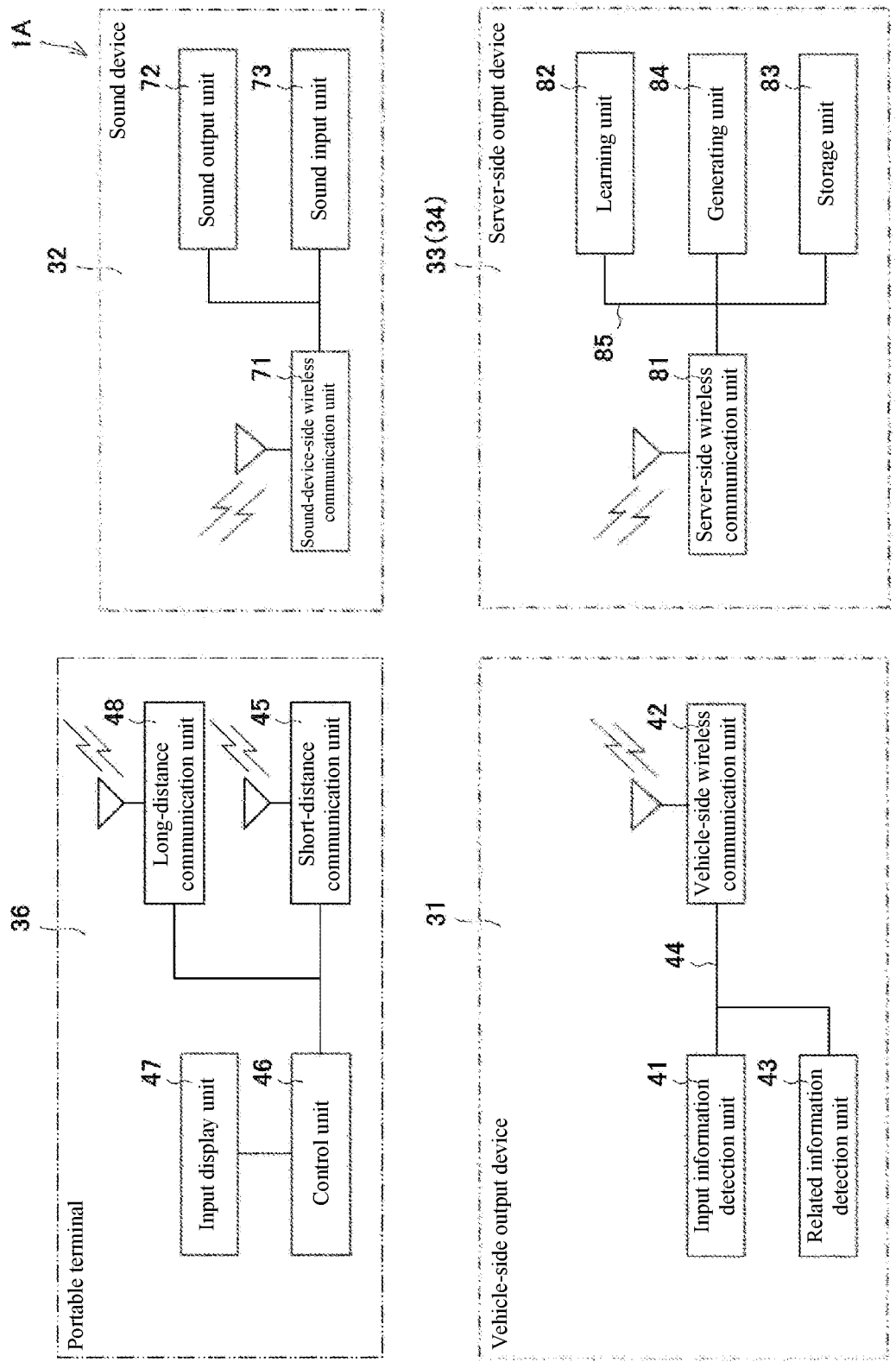
FIG. 5 is a block diagram showing a configuration of an information output apparatus according to a second embodiment.
Figure 6:
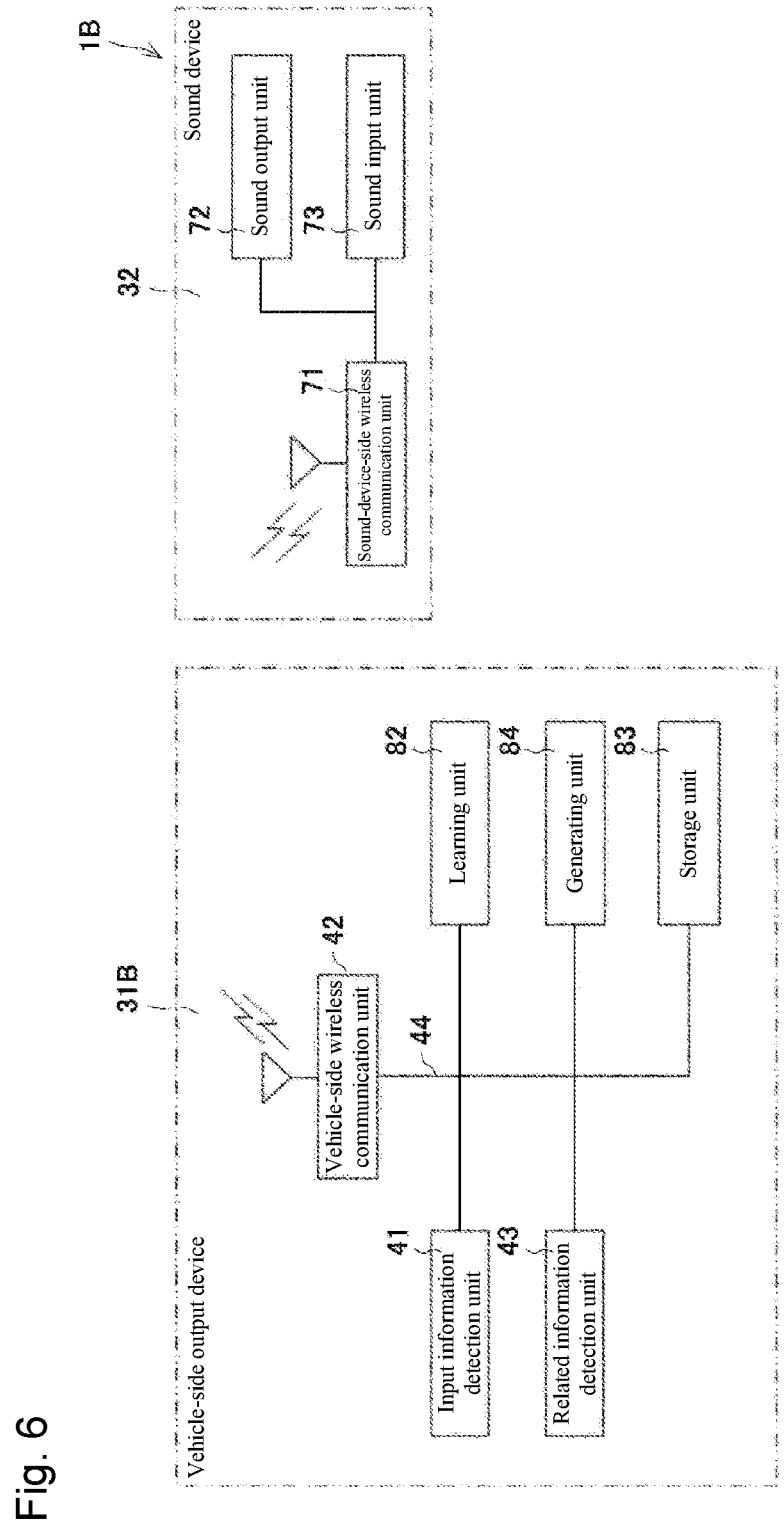
FIG. 6 is a block diagram showing a configuration of an information output apparatus according to a third embodiment.

The information output apparatus 1A of the second embodiment shown in FIG. 5 includes a vehicle-side output device 31, a sound device 32, a server-side output device 33, and a portable information terminal 36. The portable information terminal 36 includes a short-distance communication unit 45, a control unit 46, an input display unit 47, and a long-distance communication unit 48. The short-distance communication unit 45 is configured to perform short-distance wireless communication (for example, Bluetooth (registered trademark)) with each of the vehicle-side wireless communication unit 42 and the sound-device-side wireless communication unit 71. The short-distance communication unit 45 is connected to the control unit 46.

The control unit 46 acquires the input operation information and the related information respectively from the input operation detection unit 41 and the related information detection unit 43 of the vehicle-side output device 31 via the vehicle-side wireless communication unit 42 and the short-distance communication unit 45. Further, the control unit 46 is connected to the long-distance communication unit 48, and the long-distance communication unit 48 is configured to perform wireless communication with the server-side wireless communication unit 81 by using a telephone line or the like. The control unit 46 is configured to transmit the acquired information to the learning unit 82 via the long-distance communication unit 48 and the server-side wireless communication unit 81. Further, the generating unit 84 is configured to transmit the generated output information to the control unit 46 via the server-side wireless communication unit 81 and the long-distance communication unit 48. The control unit 46 receives and transmits the output information to the sound output unit 72 via the short-distance communication unit 45 and the sound-device-side wireless communication unit 71. Further, the control unit 46 is configured to acquire the sound to be input to the sound input unit 73 as the sound information via the sound-device-side wireless communication unit 71 and the short-distance communication unit 45, and then transmit the sound information to the learning unit 82 via the long-distance communication unit 48 and the server-side wireless communication unit 81. Furthermore, the control unit 46 is connected to the input display unit 47, and the control unit 46 is configured to display the information transmitted thereto on the input display unit 47 as needed.

For example, the input display unit 47 has a touch-screen input function, and allows the driver R to input an evaluation of the output information. Further, the advance questions may be displayed on the input display unit 47 so that the driver R can answer the questions through the input display unit 47. The control unit 46 transmits the input information to the learning unit 82, and the learning unit 82 is configured to learn the tendency of evaluation of the output information, the input tendencies, the output rules, and the like based on the evaluations and the answers to the questions.

The information output apparatus 1A configured as described above performs information output processing similar to that of the information output apparatus 1A of the first embodiment, although the portable information terminal 36 is interposed between the vehicle-side output device 31 and the server-side output device 33 with respect to communication. That is, step S1 is performed when the information output processing is started. In step S1 that is an information acquisition step, the input information and the related information are transmitted from the sound device 32 and the vehicle-side output device 31 to the learning unit 82 of the server-side output device 33 via the portable information terminal 36. In step S2 that is a first learning step, the learning unit 82 learns the input tendency based on the acquired input information.

In step S3 that is a generation-eligibility determination step, the generating unit 84 determines whether to generate the output information based on the output rules. In step S4 that is a generation step, the generating unit 84 refers to the input tendencies determined to be a topic in step S3, and generates the output information based on the output rules. In step S5 that is an output step, the output information generated by the generating unit 84 is transmitted from the server-side wireless communication unit 81 to the sound output unit 72 via the portable information terminal 36, and the output information is output in a form of a voice in natural language from the sound input unit 73.

In step S6 that is an evaluation presence/absence determination step, the sound information is input to the sound input unit 73 after the output of the output information, and the learning unit 82 determines whether or not the sound information includes any evaluation of the output information. In the case where the sound information does not include any evaluation, the process returns to step S1, and in the case where the sound information includes an evaluation, the process moves to step S7. In step S7 that is a second learning step, the learning unit 82 learns the output rules based on the evaluation of the output information.

The information output apparatus 1A of the second embodiment configured in this manner has the same functions and effects as the information output apparatus 1 of the first embodiment.

Third Embodiment

An information output apparatus 1B of a third embodiment is similar in configuration to the information output apparatus 1 of the first embodiment. Therefore, the configuration of the information output apparatus 1B according to the third embodiment will be described only for a configuration that is different from that of the information output apparatus 1 of the first embodiment, and the descriptions of the same configurations will be omitted.

The information output apparatus 1B of the third embodiment includes a vehicle-side output device 31B. That is, the vehicle-side output device 31B not only detects various information using an input operation detection unit 41 and a related information detection unit 43, but also learns the input tendencies based on the detected information and the sound information, and generates the output information according to the learned contents. The configuration of the vehicle-side output device 31B will be described below.

The vehicle-side output device 31B includes an input operation detection unit 41, a vehicle-side wireless communication unit 42, a related information detection unit 43, a learning unit 82, a storage unit 83, and a generating unit 84, which are connected to each other by wiring. The functional components have the same function as the functional components of the information output apparatus 1 of the first embodiment, and the input operation detection unit 41 and the related information detection unit 43 respectively transmit the detected input operation information and the detected related information to the learning unit 82. Further, the learning unit 82 acquires the sound information from the sound device 32 via the vehicle-side wireless communication unit 42, and learns the input tendencies based on the acquired input operation information and the acquired sound information. The storage unit 83 stores the learned contents, the output rules, and the like, and the generating unit 84 refers to the learned contents and generates the output information based on the output rules. Further, the generating unit 84 transmits the generated output information to the sound output unit 72 via the vehicle-side wireless communication unit 42 and the sound-device-side wireless communication unit 71 to output the output information in a form of sound from the sound output unit 72.

The information output apparatus 1B configured as described above performs the information output processing in the same manner as the information output apparatus 1 of the first embodiment except that information is exchanged between the input operation detection unit 41 and the related information detection unit 43, and the learning unit 82 and the storage unit 83 through wiring such as the bus 44, instead of the wireless communication units 42, 81.

According to the information output apparatus 1B configured as described above, output information generation function is completed within the motorcycle 2 without using the cloud server 34, thereby enabling reduction in the costs for the facilities.

In addition, the information output apparatus 1B of the third embodiment has the same functions and effects as the information output apparatus 1 of the first embodiment.

Other Embodiments

Figure 7:
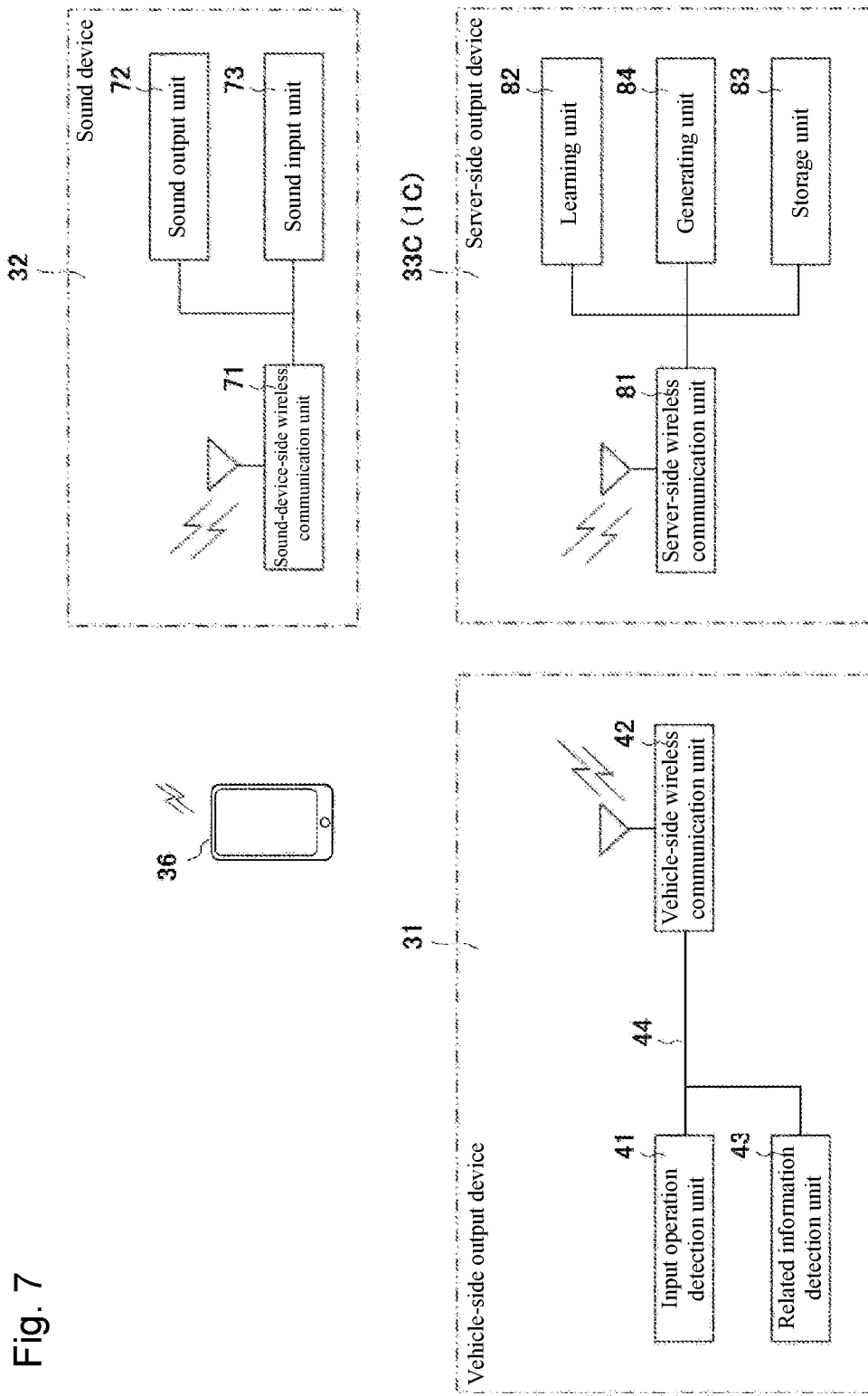
FIG. 7 is a block diagram showing a configuration of an information output apparatus according to another embodiment.

Although the first embodiment describes that the information output apparatus 1 includes the vehicle-side output device 31, the sound device 32, and the server-side output device 33, the information output apparatus 1 does not necessarily include all of the vehicle-side output device 31, the sound device 32, and the server-side output device 33. That is, only the cloud server 34 of the server-side output device 33C may be provided as the information output apparatus 1C as shown in FIG. 7, and information such as the driving operation information, the related information, and the setting information is exchanged between the information output apparatus 1C and the vehicle-side output device 31, so that the output information can be provided to the driver R.

Each of the information output apparatuses 1, 1A, 1B of the first to third embodiments includes various sensors 51 to 59, 61 to 64, but may further includes a gyro sensor attached to the helmet of the driver R. The gyro sensor described below is configured to detect the direction of the face and the line of sight of the driver R. In addition, the gyro sensor may be configured to detect error information to be output by the engine ECU. The information detected from the gyro sensor and the error information are referred to as the related information when the generating unit 84 generates the output information. The physical condition of the driver R may be acquired by the sound information to be input through a sound input device 92 and the sensors, and may be referred thereto at the time of learning, and various information can be referred to at the time of learning.

In the information output apparatuses 1, 1A and 1B according to the first to third embodiments, the tendency of the evaluation of the output information by the driver R is learned based on the sound information from the sound device 31, but the evaluation may be acquired by mounting a brain wave sensor on the helmet 35 and detecting brain waves of the driver R. In addition, evaluation may be acquired through the perspiration and the heartbeat of the driver R.

LIST OF REFERENCE CHARACTERS

R driver
1, 1A, 1B information output apparatus
2 motorcycle
32 sound device
34 cloud server
41 input operation detection unit
42 vehicle-side wireless communication unit
43 related information detection unit
58 input unit
85 learning unit
84 generating unit

The invention claimed is:

1. An information output apparatus for a straddle vehicle configured to provide output information to a driver, the information output apparatus comprising:
a receiving unit configured to receive input information input by the driver;

a learning unit configured to learn an input tendency that is a tendency of the input information by the driver based on the input information received by the receiving unit;

a generating unit configured to generate the output information based on an output rule according to a learned content learned by the learning unit; and an output unit configured to cause a sound device to output the output information generated by the generating unit in a form of a voice in natural language, wherein the learning unit is configured to learn to adjust the output rule according to the driver's preference by obtaining an evaluation of the output information by the driver.

2. The information output apparatus for the straddle vehicle according to claim 1, wherein the receiving unit is configured to receive information on sound input through a sound input device that receives input by sound.

3. The information output apparatus for the straddle vehicle according to claim 1, wherein the output information includes vehicle condition information on a condition of the straddle vehicle.

4. The information output apparatus for the straddle vehicle according to claim 1, wherein the output information includes driving operation assistance information on assistance for a driving operation by the driver, and the driving operation assistance information is output information including a suggestion on the driving operation to the driver.

5. The information output apparatus for the straddle vehicle according to claim 1, wherein the output information includes vehicle body setting information on assistance in setting a traveling function of the straddle vehicle, and the vehicle body setting information is output information suggesting vehicle body settings of the vehicle at a predetermined timing.

6. The information output apparatus for the straddle vehicle according to claim 1, wherein the receiving unit is configured to receive sound setting information on a mode of natural language selected by the driver from among a plurality of modes of natural language, and the output unit is configured to cause the sound device to output the output information in a form of a voice in natural language in the mode selected by the driver based on the sound setting information.

7. The information output apparatus for the straddle vehicle according to claim 1, wherein the receiving unit is configured to receive external information besides the input information input by the driver, and the generating unit is configured to generate the output information according to the learned content and the external information.

8. The information output apparatus for the straddle vehicle according to claim 1, wherein the receiving unit is configured to receive as the input information, an output from at least one of a sensor configured to detect information on the straddle vehicle and an input device used for manual input by the driver, and the sensor includes a gyro sensor configured to detect a roll angle, a pitch angle, and a yaw angle of the vehicle, or a load sensors are configured to detect a lateral weight shift of the driver.

9. The information output apparatus for the straddle vehicle according to claim 1, further comprising a storage unit configured to store predetermined identification information in association with the learned content by the learning unit, wherein the receiving unit is configured to receive the identification information together with the input information, and the learning unit is configured to acquire the learned content from the storage unit based on the identification information received by the receiving unit, and learn the input tendency of the driver based on the acquired learned content and the input information received by the receiving unit.

10. The information output apparatus for the straddle vehicle according to claim 1, wherein the learning unit is disposed at a position away from a vehicle body of the straddle vehicle, and the receiving unit is configured to receive the input information transmitted from a transmission unit that is provided on the vehicle body and is configured to perform wireless communication.

11. A method of outputting information for a straddle vehicle configured to provide output information to a driver, the method comprising:

a receiving step of receiving input information input by the driver;

a learning step of learning an input tendency that is a tendency of input information by the driver based on the input information received in the receiving step;

a generating step of generating the output information based on an output rule according to a learned content learned in the learning step; and an output unit of outputting the output information generated in the generating step from a sound device in a form of a voice in natural language, wherein in the learning step, the learning is performed so as to adjust the output rule according to the driver's preference by obtaining an evaluation of the output information by the driver.

12. The information output apparatus for the straddle vehicle according to claim 1, wherein the generating unit configured to generate the output information evaluating a driving operation of the driver and suggesting a measure to improve the evaluated results.

13. The information output apparatus for the straddle vehicle according to claim 1, wherein the learning unit configured to learn the driver's evaluation of the output information based on the driver's response to the voice which is output by the sound device, so as to generate a situation in which the driver feels as if talking with someone.

14. The information output apparatus for the straddle vehicle according to claim 1, wherein the generating unit configured to change the output rule on the basis of which the output information is generated, based on the evaluation of the output information by the driver.

15. The information output apparatus for the straddle vehicle according to claim 1, wherein the evaluation of the output information is included by a sound information to be input via the receiving unit by the driver.

16. The information output apparatus for the straddle vehicle according to claim 1, wherein the input information includes information on a tendency of a driving operation by the driver.

17. The information output apparatus for the straddle vehicle according to claim 1, further comprising a storage unit configured to store answers to questions regarding a plurality of items that has been input in advance by the driver, wherein the learning unit is configured to grasp a basic outline of the input tendency based on the answers stored by the storage unit, and learn the input tendency from the input information based on the basic outline.

18. The information output apparatus for the straddle vehicle according to claim 1, wherein the input information includes information from a control system of the vehicle.

19. An information output apparatus for a straddle vehicle configured to provide output information to a driver, the information output apparatus comprising:
- a receiving unit configured to receive input information input by the driver;
- a learning unit configured to learn an input tendency that is a tendency of the input information by the driver based on the input information received by the receiving unit;
- a generating unit configured to generate the output information based on an output rule according to a learned content learned by the learning unit; and
- an output unit configured to cause a sound device to output the output information generated by the generating unit in a form of a voice in natural language, wherein the input information includes information on a tendency of a driving operation by the driver.

* * * * *